Patented Sept. 16, 1941

2,255,916

UNITED STATES PATENT OFFICE 2,255,916

ETHERS OF GLYCEROL

George L. Doelling, St. Louis, Mo.

No Drawing. Application April 4, 1938,
Serial No. 199,862

5 Claims. (Cl. 167—22)

This invention relates to ethers of glycerol useful as antiseptics.

It is an object of this invention to provide an improved antiseptic for general as well as various special uses. I have found that certain of the glycerol di-ethers and certain of the glycerol mono-ethers possess properties which make them particularly useful as antiseptics.

There are certain properties which a good antiseptic or germicide must possess. The first property is, of course, the ability to kill microbic organisms and this ability is often compared by means of a phenol coefficient. A high phenol coefficient in itself, however, does not indicate a desirable antiseptic for there are other important characteristics to consider. The antiseptic must not be too toxic or poisonous for obvious reasons. It would be impossible, of course, to use a very poisonous antiseptic as a mouth wash, as a constituent of tooth paste, or in other items that may be used in and around the mouth.

It has been found that certain compounds used as antiseptics and germicides lose much of their effectiveness when brought in contact with blood serum or other organic matter of the body. Mercury compounds furnish an example of such antiseptics. It is, therefore, essential that the bacteria-killing ability of the antiseptic is not appreciably reduced when the antiseptic is brought in contact with the blood or other organic matter.

An important characteristic of any antiseptic is its water solubility. It should be remembered that in nearly all cases where an antiseptic is applied to areas of the body, that water or moisture of the body is present. The effect of this water is to dilute the antiseptic. It can be seen, therefore, that if the antiseptic is too dilute when applied to a body area, the water of the body present may dilute the antiseptic to a point where it will no longer be effective. The solubility of some antiseptics is so low that a strong water solution cannot be made, and for this reason, they lose their effectiveness when applied. In order to raise the strength of antiseptic solutions containing antiseptics which are relatively low in solubility, solvents other than water are often employed. The difficulty with such solutions is that the antiseptic is thrown out of solution when brought in contact with the water of the body. An antiseptic which has a relatively high solubility is readily carried to all parts of a treated area of the body by the moisture and water which is always present. It can thus be seen that a high water solubility is to be desired of an antiseptic.

To be useful for all purposes the antiseptic should also be a non-irritant. Many very good antiseptics otherwise do not satisfy this requirement. Thus iodine and certain phenol compounds often prove too irritating to place on tender areas.

The antiseptic should not be too vigorous an oxidizing agent for the strength of such antiseptics is often wasted in oxidizing healthy tissue rather than killing germs.

It can thus be seen that numerous and varied properties are required of a good antiseptic.

Throughout the specification and claims, I use the word "antiseptic" in the general and broadest sense and include germicides, disinfectants, microbicides, fungicides, etc. Substances inimical to the growth of micro-organisms of disease, putrefaction, and fermentation and substances which kill microbes, molds, germs, bacteria, and viruses are included in the term as used here.

As was stated above, I have found that certain glycerol di-ethers and mono-ethers fulfill this requirement and, in addition, have certain other desirable qualities.

I have found that the glycerol di-ethers and mono-ethers having not less than three nor more than five carbon atoms per molecule in the alkyl group or groups possess properties which make them suitable for antiseptics.

The glycerol di-ethers may be represented thus:

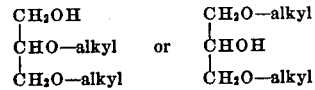

and the mono-ethers of glycerine thus:

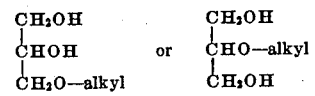

It is possible to use any of the following alkyl groups in the above:

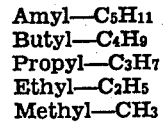

Of the mono-ethers, the propyl, butyl, or amyl will come within the requirement of not less than three nor more than five carbon atoms in the alkyl group.

Likewise, the methyl-ethyl, methyl-propyl, methyl-butyl, di-ethyl, and ethyl-propyl will fulfill the requirements in the glycerol di-ethers.

I have found the mono-glycerol ethers derived from glycerine and any of the following alcohols are satisfactory. Normal, active, pentanol-2, pentanol-3, iso and tertiary amyl alcohols, and normal, iso, secondary and tertiary butyl alcohols, and normal- and iso-propyl alcohols. Of the di-ethers the various isomeric forms of the propyl and butyl radicals can be used, as for example, ethyl-iso-propyl in place of ethyl-propyl.

The literature describes iso-amyl and tertiary-amyl ether of glycerine and methods of preparing the same although their antiseptic or germicidal properties are not mentioned.

I have found that alpha mono normal amyl ether of glycerine having the formula:

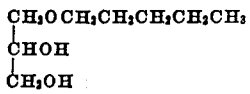

may be prepared in the following manner: 21 grams of metallic sodium are dissolved in 300 c.c. of normal amyl alcohol at 30–90° C. At the end of this reaction, 100 grams of alpha glycerol monochlorhydrin is added to this mixture while stirring over about two hours at about 90° C. The mixture is held at this temperature for about one hour after the monochlorhydrin is added, after which it is cooled and the salt filtered off. The solution is then neutralized with acid and vacuum distilled through a fractionating column to remove the alcohol. After removal of the alcohol, the normal amyl ether of glycerine came over for a yield of about 50 grams.

The other amyl ethers were made in the same manner but with the corresponding alcohol as raw material. For example, when pentanol-2 was used, the alpha mono glycerol ether of pentanol-2 was produced. These ethers can also be produced from mono sodium glycerate and the corresponding amyl chloride or bromide preferably in the presence of a suitable diluent.

The boiling point of the alpha mono normal amyl ether of glycerine was 137–139° C. at 8 to 10 mm. Its specific gravity was .993. The surface tension was found to be approximately 26. This low surface tension is desirable in antiseptics for it causes the antiseptic to cling to the surface being treated and is especially advantageous in throat washes or gargles. The compound was found to be miscible with water. This, of course, is a distinct advantage for an antiseptic as explained above. When a solution of the compound in water was made very weak, a cloudiness appeared which, however, proved to have no deleterious effect on the antiseptic.

I have found that a 5% solution of n-amyl ether of glycerine kills B. Typhosus in 5 minutes and Staph. Aureus in 15 minutes. It can then be seen that if a 30% solution in water is used, it will be 6 times the strength needed to kill these organisms and hence, dilution by body fluids will not readily dilute it beyond its limit of usefulness in killing bacteria.

The substance is colorless and, consequently, does not stain the skin or clothing as do some antiseptics. The antiseptic does not appear to have an irritating effect on the skin and cutaneous toxicity tests on animals show no pathological changes. Tests on the toxicity of the antiseptic as introduced orally into animals have been made and show that the toxicity of the antiseptic is low enough to permit its general use, by the public, without danger. The toxicity is low enough to permit the use of the antiseptic to be used in tooth pastes, mouth washes, and gargles.

The compound thus satisfies the requirements of an antiseptic previously set forth especially those two important items of low toxicity and high solubility.

The concentrations of solution employed will, of course, vary according to the particular manner in which they are to be used. I have used a 25% solution with success and have also found that such a solution of mono normal amyl ether of glycerine may be applied either alone or in combination with other substances such as boric acid as an antiseptic, germicide, or disinfectant. Because of the stainless and relatively low toxic properties of these glycerine ethers, they may well be used as an antiseptic agent in tooth pastes, hair washes, ointments, after shaving lotions, cleansing creams, sterilization mixtures, mouth washes, and in various other agents where an antiseptic with the characteristics of these ethers would be desirable.

I have also found that these glycerine ethers and particularly the mono alpha normal amyl ether of glycerine have very definite detergent qualities. This makes these compounds particularly useful where an antiseptic with detergent properties or a detergent with antiseptic properties is desired. Because of the detergent properties of these compounds, they will, of course, be useful wherever detergents are used and particularly for washing dishes, surgical instruments, or as a germicidal hand or body wash.

The compounds are stable and do not lose their effectiveness on exposure to heat or light. They are not phenol or mercury compounds and are, therefore, not subject to the disadvantages of these compounds previously set forth.

The compounds are not oxidizing agents nor is their effectiveness impaired seriously by the presence of blood serum or other organic matter of the body.

While I have described the properties of the n-amyl ether of glycerine, I have found that the active amyl, pentanol-2 and pentanol-3 ethers of glycerine also possess the characteristic properties of this group and are useful as antiseptics. I give below the boiling points and specific gravities of these compounds:

Active amyl ether of glycerine

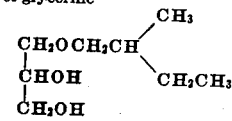

Boiling point 125–127° C. at about 4 m
Specific gravity .988

Pentanol-2 ether of glycerine

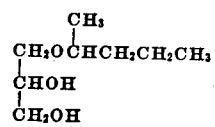

Boiling point 114–115° C. at about 4 mm.
Specific gravity .990

Pentanol-3 ether of glycerine

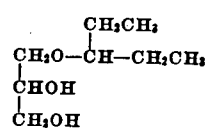

Boiling point 100–101° C. at about 2 mm.
Specific gravity .994

Thus while I have found means and methods of preparing the described compounds and although I have particularized on their use as an antiseptic or detergent, I also desire to claim some of them as new products of manufacture. Although I have described in more detail the n-amyl ether of glycerine, I have done so merely to give an example of one of the types of the compounds which I have found as useful and desirable, and the spirit and scope of my invention is not to be limited thereby but is to be defined by the appended claims.

I claim:

1. An antiseptic and detergent solution comprising a mono-amyl ether of glycerine and water, the mono-amyl ether of glycerine being over five per cent by volume of the solution.

2. An antiseptic and detergent solution comprising a mono-normal amyl ether of glycerine and water, the mono-normal amyl ether of glycerine being over five per cent by volume of the solution.

3. An antiseptic and detergent solution comprising a mono-active amyl ether of glycerine and water, the mono-active amyl ether of glycerine being over five per cent by volume of the solution.

4. An antiseptic and detergent solution comprising a mono-glycerol ether of pentanol-2 and water, the mono-glycerol ether of pantanol-2 being over five per cent by volume of the solution.

5. An antiseptic and detergent solution comprising a mono-glycerol ether of pantanol-3 and water, the mono-glycerol ether of pentanol-3 being over five per cent by volume of the solution.

GEORGE L. DOELLING.